INVENTORS
JOSEPH PUCCI
THOMAS J. RYAN
BY Arthur N. Klein
ATTORNEY

June 28, 1960  J. PUCCI ET AL  2,942,643
METHOD OF AND APPARATUS FOR CUTTING
AND SHAPING STRIP MATERIAL
Filed Oct. 11, 1957   5 Sheets-Sheet 2
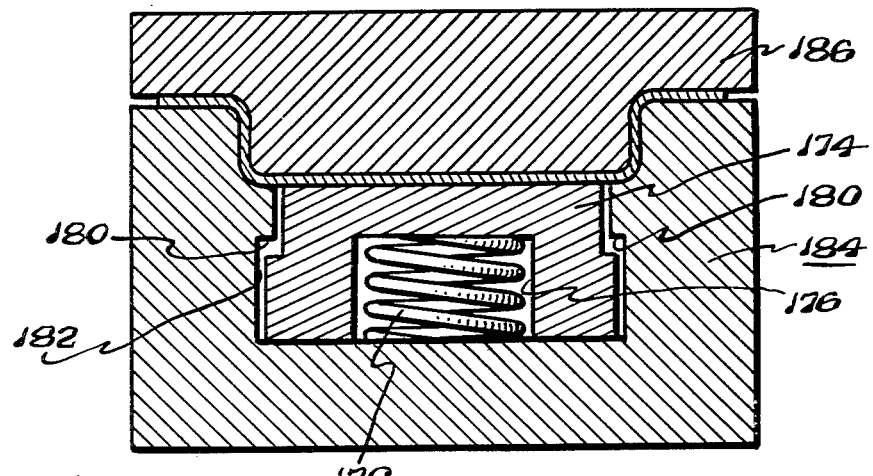
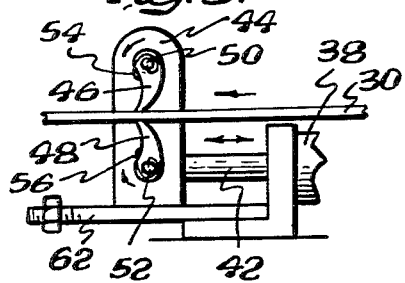
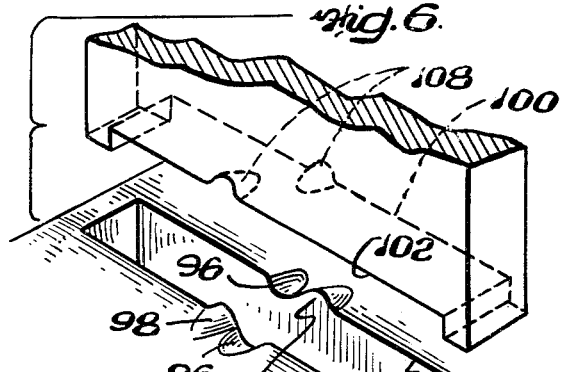
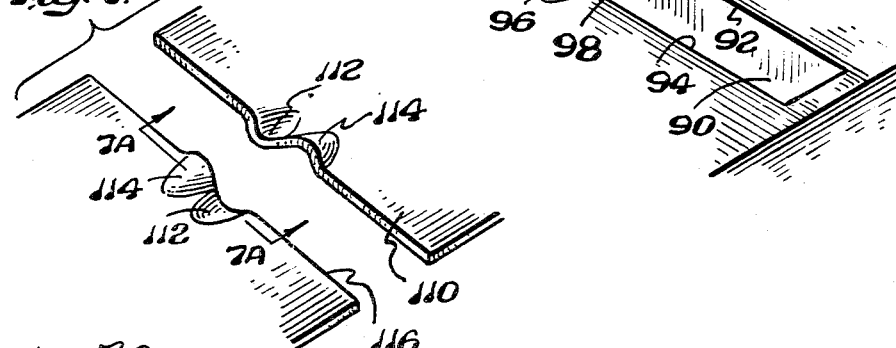
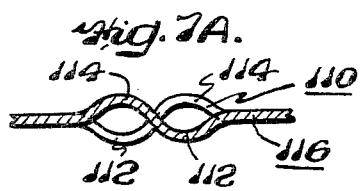
INVENTORS
JOSEPH PUCCI
THOMAS J. RYAN
BY Arthur N. Klein
ATTORNEY

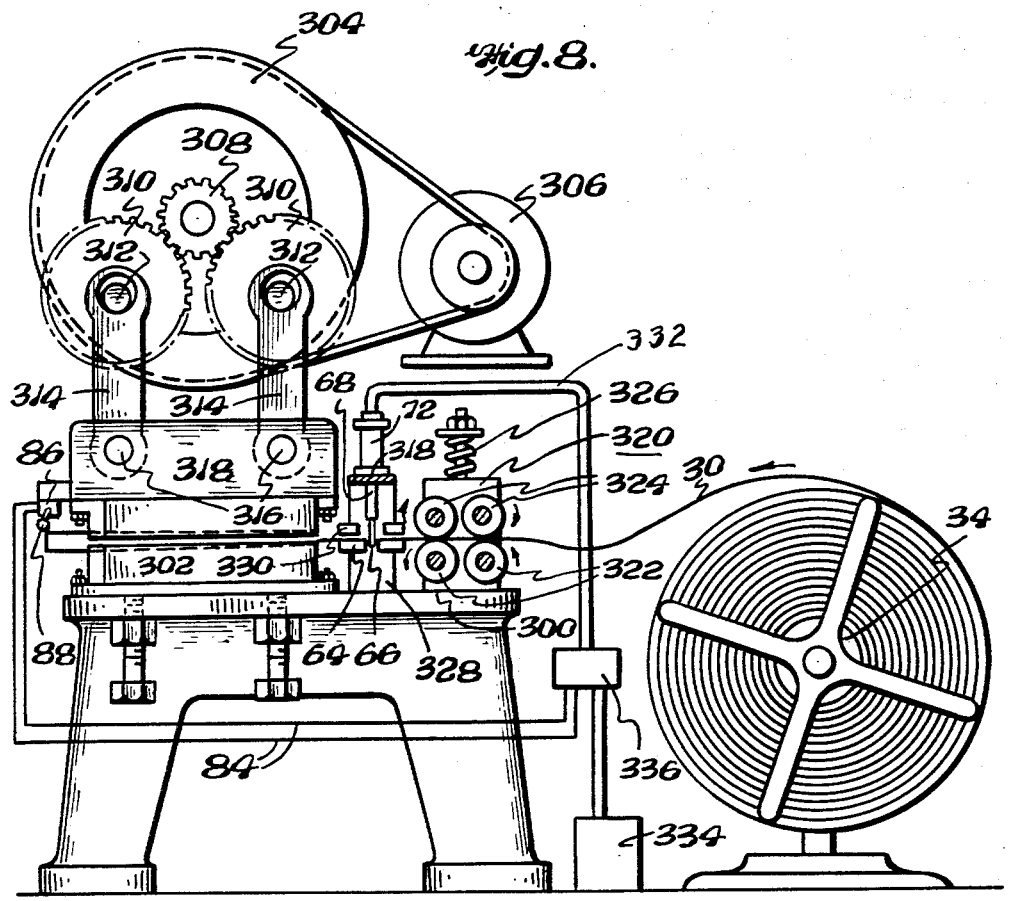
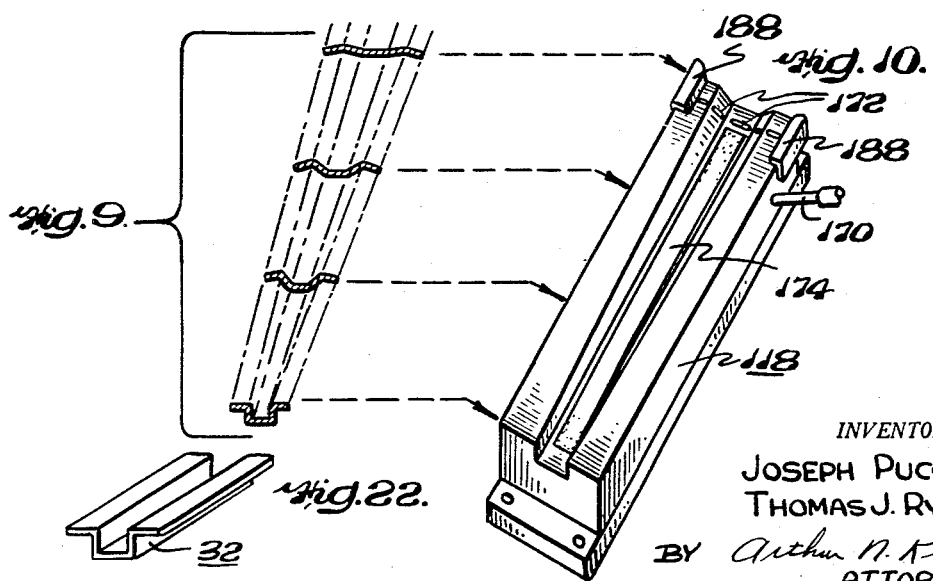

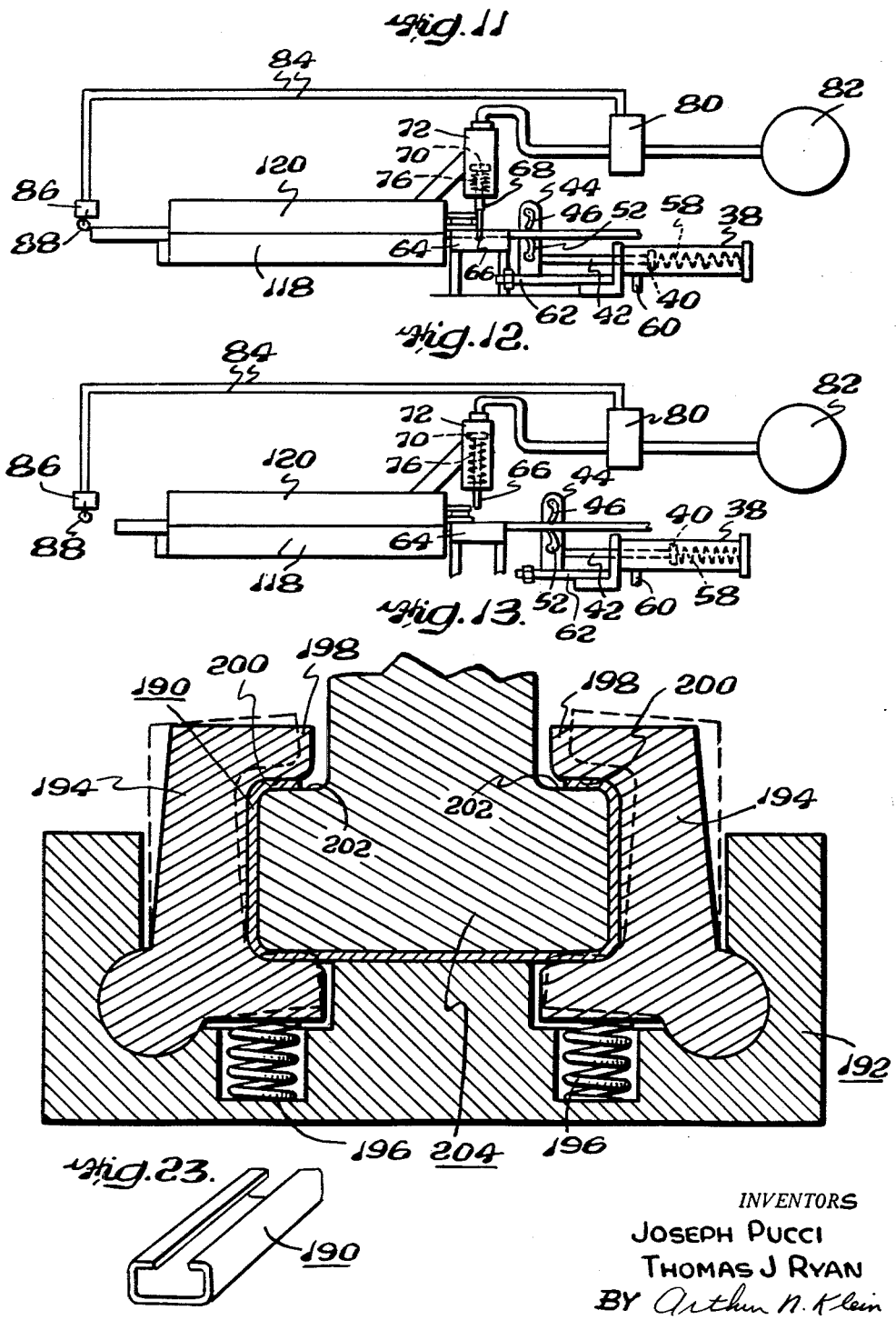

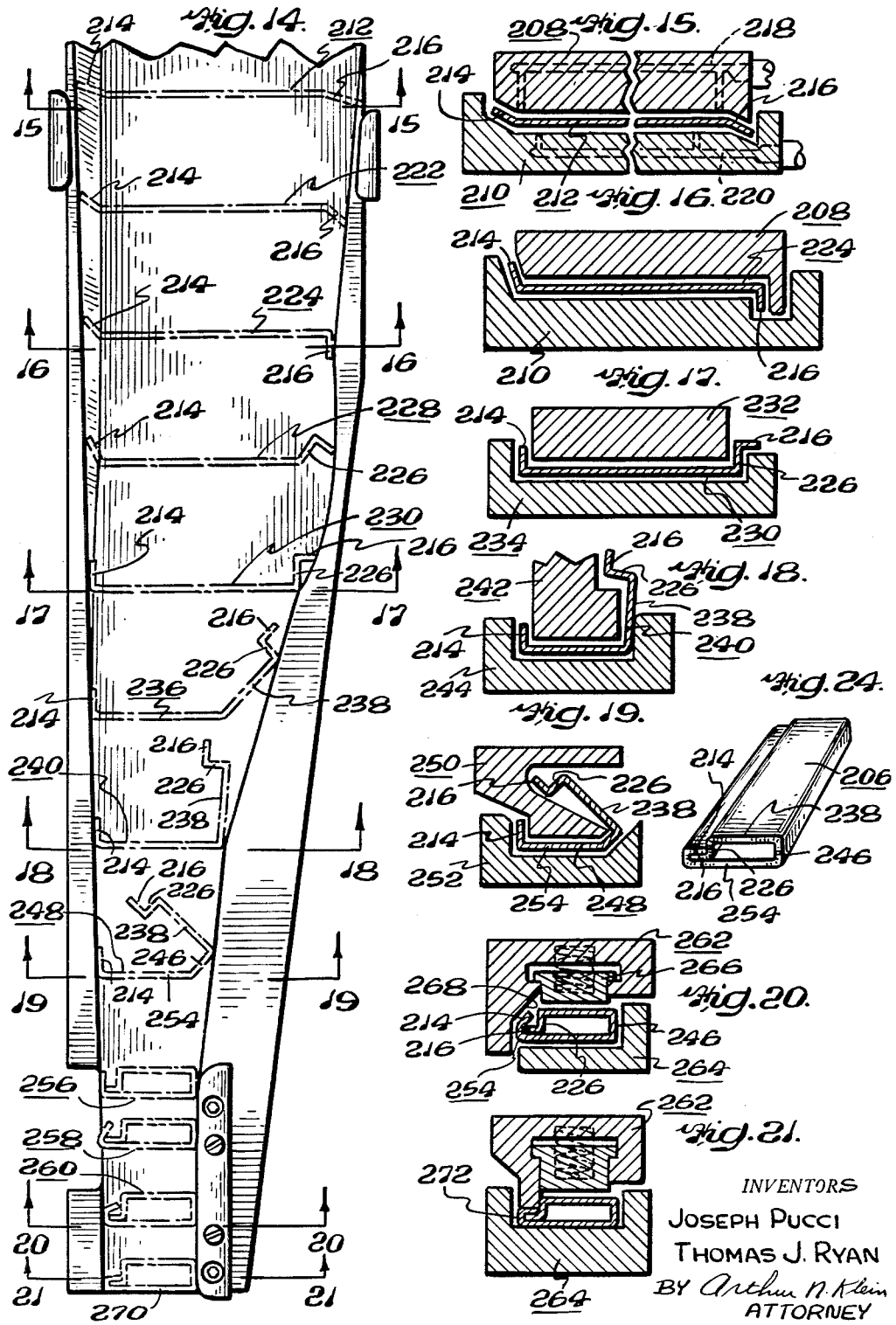

United States Patent Office 2,942,643
Patented June 28, 1960

2,942,643

METHOD OF AND APPARATUS FOR CUTTING AND SHAPING STRIP MATERIAL

Joseph Pucci, 415 E. Gowen Ave., and Thomas J. Ryan, 426 E. Allens Lane, both of Philadelphia, Pa.

Filed Oct. 11, 1957, Ser. No. 689,586

19 Claims. (Cl. 153—2)

The present invention relates to the continuous forming of generally flat ribbon stock (of metal or like deformable material) into shaped products of various cross-sectional configuration.

An object of this invention is to provide a new and useful method of, and apparatus for, the rapid, simple and inexpensive, and continuous shaping of generally flat elongated ribbon stock (of metal or like deformable material) into shaped products of various cross-sectional configuration.

Other objects and advantages of the present invention are apparent in the following detailed description and appended claims, and in the accompanying drawings forming part hereof.

For the purpose of illustrating the invention, there are shown in the drawings certain forms thereof which are presently preferred; it being understood however that this invention is not limited to the precise arrangements and instrumentalities shown.

Referring to the drawings in which like reference characters indicate like parts throughout:

Figure 4 is an enlarged cross-sectional view through the forming dies, taken generally along the line 4—4 of Fig. 1.

Figure 5 is an enlarged elevational view of the strip feeding mechanism of Fig. 1.

Figure 6 is a schematic enlarged fragmentary perspective view of the cut-off dies.

Figure 7 is a schematic enlarged fragmentary perspective view of the adjoining edges of the cut sheet stock leaving the cut-off dies; the opposed deformations or "burrs" which enable the following length to push the cut-off piece through the forming dies being somewhat exaggerated for greater clarity of illustration.

Figure 7A is a fragmentary cross-sectional view taken generally along the line 7A—7A of Fig. 7.

Figure 8 is a schematic elevational view, generally like that of Fig. 1, but showing another machine forming a different embodiment of this invention employing a mechanically operated movable forming die.

Figure 9 is a schematic view illustrating various stages in the method of gradually forming a flat strip into a product having a "hat" section; that is, a cross-sectional configuration in the form of a U with diverging parallel side flanges.

Figure 10 is a perspective view of the stationary or fixed forming die of Fig. 1; the approximate points at which the different stages of Fig. 9 are reached being indicated by arrows.

Figure 11 is a schematic view of the control system for the cut-off dies; the movable cut-off die being shown in extended cutting position.

Figure 12 is a view like that of Fig. 11 but showing the movable cut-off die in retracted non-cutting position.

Figure 13 is a cross-sectional view like that of Fig. 4 but showing different forming dies for forming the last stage in the production of a channel member of generally U-shaped cross-sectional configuration with parallel inturned side flanges.

Figure 14 is a schematic view illustrating various stages in the method of gradually forming a flat strip into a product having a closed box cross-sectional configuration.

Figures 15 to 21 are schematic cross-sectional views of the various forming dies used in series in the gradual production of the box section; the views corresponding to the section lines on Fig. 14.

Figure 22 is a perspective view of a "hat section" member formed in accordance with the present invention employing the forming dies shown in Figs. 4, 9 and 10.

Figure 23 is a perspective view of a channel member with inturned flanges formed in accordance with the present invention employing, inter alia, the rocker dies shown in Fig. 13.

Fig. 24 is a perspective view of an open-ended "box" member formed in accordance with the present invention employing the steps and forming dies illustrated in Figs. 14–21.

Figure 1:
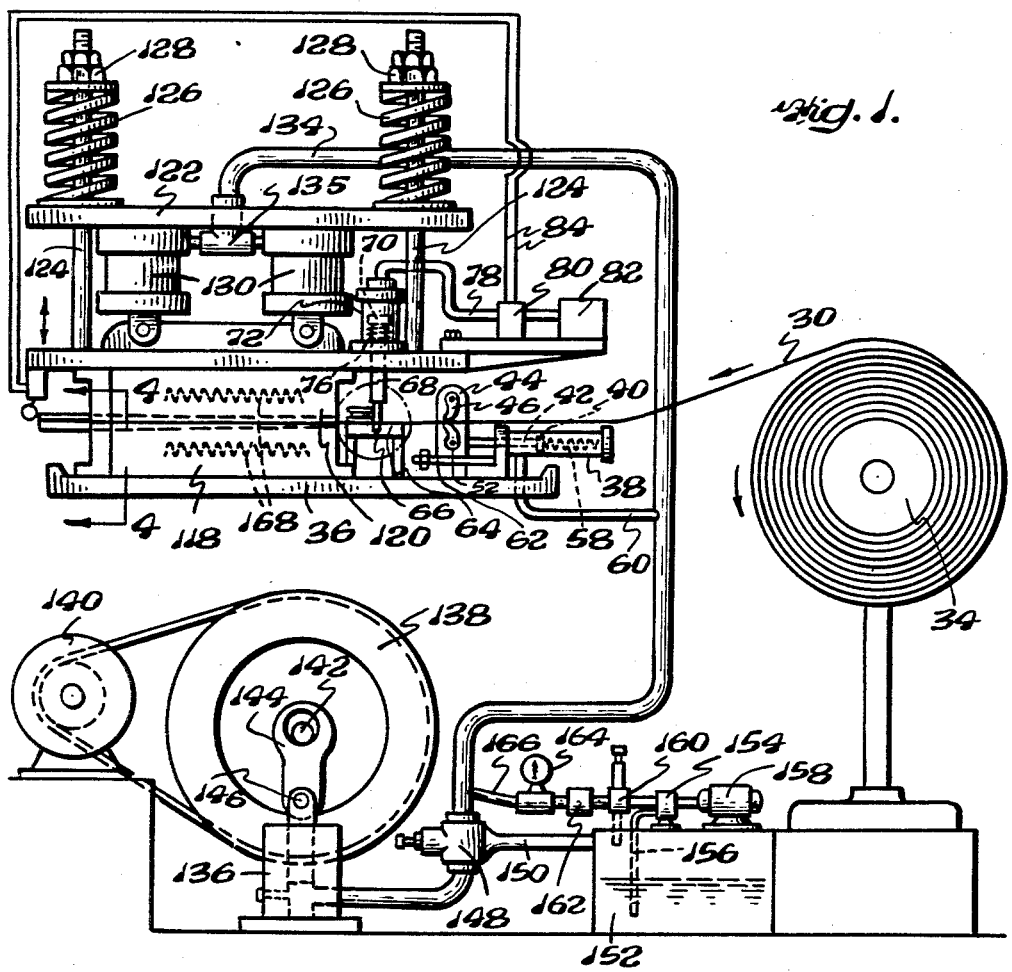
Figure 1 is a schematic elevational view of a machine for the continuous forming of flat metal strip into lengths of product of shaped cross-sectional configuration, employing a hydraulically operated short-stroke movable forming die.

In Fig. 1 there is shown schematically a hydraulically operated machine for forming an elongated continuous strip or ribbon 30 of deformable sheet metal into individual lengths of predetermined cross-sectional configuration, for example the piece 32 of "hat" section shown in Fig. 22. In Fig. 1, the flat strip 30 is shown as being fed from a helical coil wound around a rotatable drum or reel 34. However the flat strip 30 can be stored in straight lengths, especially where the thickness or nature of the metal makes coiling undesirable or impossible.

The flat strip 30 is gradually pulled from the coil and advanced (toward the left in Fig. 1) by intermittent feed mechanism shown in Figs. 1 and 5 which intermittently pushes cut lengths of the strip through the cut-off and forming dies, as will be described. The feed mechanism is mounted on a lower horizontal stationary frame member 36 and includes a generally horizontal cylinder 38 having a piston 40 slidably disposed therewithin; the piston having a stem 42 which is constructed and arranged to pass through one end wall of the cylinder in fluid-tight movable relationship therewith. The protruding end of the stem 42 carries a generally vertically disposed member 44 upon which are mounted upper and lower fingers 46 and 48 pivoted on pins 50 and 52 fastened to the member. The fingers 46 and 48 are more or less pawl-shaped and are provided with springs 54 and 56 mounted on the pins 50 and 52 and urging the fingers so that their free ends are yieldably maintained in opposition to each other. In Fig. 5, the ends of the fingers 46 and 48 are curved so that they terminate slightly to the left of the vertical line connecting the pins 50 and 52. The spring 54 urges the upper finger 46 counterclockwise, while the spring 56 urges the lower finger 48 clockwise, so that the downwardly directed free end of the upper finger 46 and the upwardly directed free end of the lower finger 48 contact the upper and lower faces respectively of the strip 30 which passes horizontally between the fingers.

A compression spring 58 mounted within the cylinder 38 to the right of the piston 40 and normally urges the piston 40 and stem 42 to extended position (that is, toward the left in Fig. 1). A fluid inlet line 60 leads to the cylinder 38 adjacent the opposite end thereof (that is, on the left side of the piston 40). When fluid under pressure enters the left hand end of the cylinder 38 from the line 60, it forces the piston 40 and stem 42 to retracted position (that is, toward the right in Fig. 1) against the pressure of the spring 58. When the fluid pressure is cut off, the spring 58 returns the piston 40 and stem 42 to extended position. In Fig. 1, the fluid line 60 is shown as connected to the hydraulic liquid system for actuating the movable forming die, as will be described. However, it is possible to use a gas system, for example compressed air, to actuate the cylinder 38 from the inlet line 60.

On the outward stroke (toward the left in Fig. 1) of the piston 40, stem 42 and end member 44, the opposed free ends of the pivoted spring-urged fingers 46 and 48 grip the opposite faces of the intervening strip 30 and, due to the frictional engagement provided by the pawl-shaped fingers, move the strip 30 (also toward the left in Fig. 1) a distance substantially equal to the extent of outward travel of the piston and stem. On the fluid-actuated return stroke of the piston and stem, the fingers 46 and 48 yield and no longer provide frictional gripping engagement with the strip 30 so that the strip remains stationary during this return movement of the feed mechanism. In other words, the strip advances intermittently toward the left in Fig. 1, while the piston, stem and the end member 44 reciprocate. It should be noted that the arrangement of the pawl-shaped fingers 46 and 48 is such that movement toward the left rotates the fingers to provide a secure frictional engagement with the strip 30, whereas movement toward the right causes opposite spreading rotation of the fingers enabling the fingers to be shifted toward the right without producing any corresponding movement of the strip.

For greater rigidity, the bottom of the end member 44 may be slidably supported on one or more horizontal slide members 62.

To the left of the feed mechanism, in Fig. 1, there is located the cut-off mechanism for severing lengths of strip 30 prior to entry into the forming die mechanism.

Figure 2:
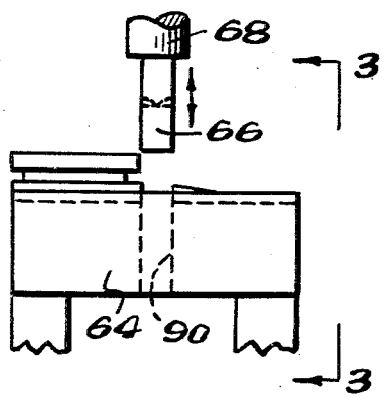
Figure 2 is an enlarged elevational view, taken generally in the area of the dash-dot circle of Fig. 1, showing the cut-off die.
Figure 3:
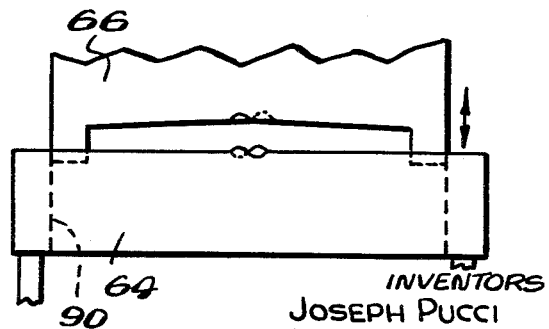
Figure 3 is an elevational view of the cut-off die taken generally at right angles to the view of Fig. 2 and looking in the direction of the arrows 3—3 of Fig. 2.

The cut-off mechanism, which is also shown in Figs. 2, 3 and 6, includes a lower stationary die 64 mounted on the lower frame member 36 and an upper movable die 66 mounted on the lowermost protruding end of the stem 68 of a piston 70 disposed within a vertical cylinder 72 mounted upon a horizontal, vertically reciprocable platform 74 to be more fully described. The piston 70 and stem 68 are normally urged to uppermost retracted position by a compression spring 76 disposed within the lower end of the cylinder 72. A fluid inlet line 78 leads to the upper end of the cylinder from a solenoid valve 80 which in turn connects with an air compressor 82, both of which are also mounted on the platform 74. The solenoid valve 80 is electrically connected, through wires 84, with a quick-acting on-off switch 86 (for example of the type commonly known as a Micro-switch), as also shown in Figs. 11 and 12. The switch 86 is of the normally open type with a protruding feeler or finger 88 which is pivoted and disposed in normal or right angular position, as shown in Fig. 12, when the switch is open. The switch 86 is mounted on the underside of the platform 74 at the left hand end thereof, so that the switch feeler 88 is in line with the leading end of the work piece emerging from the forming dies (as will be described). The feeler 88 is so located that, at the completion of the final forward movement of the completed work piece, the leading end of the work piece will contact and shift the feeler 88 to the inclined position shown in Fig. 11, thereby closing the switch 86 to actuate the solenoid valve 80, opening the latter and permitting compressed air to flow from the compressor 82 and into the upper end of cylinder 72 forcing the piston and stem and die downwardly against spring pressure while strip 30 is stationary.

As best illustrated in Figs. 2, 3, 6, 7 and 7A, downward movement of the die 66 relative to the die 64 is constructed and arranged to sever the intervening flat strip 30, at predetermined intervals, into lengths of predetermined longitudinal dimension and at the same time to cause a deformation or burr at aligned points on the trailing edge of the cut-off length and the leading edge of the following main strip, so that, as the main strip is intermittently advanced by the feed mechanism, it pushes the cut-off length in front of it through the forming dies without danger of having the relatively thin leading edge of the main strip 30 ride over or under the trailing edge of the cut-off length in front of it.

For this purpose, the stationary die 64 is provided with a transversely disposed elongated generally rectangular opening 90 forming a pair of transversely extending spaced apart upper shearing edges 92 and 94. The spacing between the edges may, for example, be of the order of ¼" when working with sheet metal of usual thicknesses.

Generally at the center of the shearing edge 92, there are provided, side-by-side, a concavity or depression 96 and an elevation or protuberance 98; the two being formed more or less in continuation of each other, so that the shearing edge in that zone is generally S-shaped as shown best in Fig. 6. The opposite shearing edge 94 is also provided with a concavity 96 and protuberance 28, except that the protuberance 98 of 94 is opposite the concavity 96 of 92 while the protuberance of 92 is opposite the concavity of 94; the two S-shaped shearing edge portions intercrossing in more or less a "figure 8" pattern.

The lower end of the movable die 66 is provided with slightly recessed transversely extending spaced apart shearing edges 100 and 102 which move downward in wiping relationship to the edges 92 and 94 respectively as the die 66 moves downward relative to the die 64; the die 66 being so dimensioned as to move snugly within the die opening 90. The transverse dimension of the shearing edges 100 and 102 is dimensioned to correspond to the transverse dimension or width of the strip 30; downwardly directed vertical shoulders 104 at the ends of the shearing edges serving to contain and guide the side edges of the strip 30 as the strip passes intermittently between the vertically separated shearing edges of the two dies when the dies are in the non-cutting position shown in Fig. 3. For greater clarity of illustration, the movable die 66 is shown, in Fig. 6, as raised so that it is completely above the stationary die 64. In actual practice, the movable die never rises this far, the correct uppermost position being shown in Fig. 3; that is, with the depending side portions 106 of the upper movable die 66 never completely withdrawn from the opening 90 of the lower stationary die 64.

The shearing edge 100 of the movable die is provided with a concavity 108 which is in line with the protuberance 98 in the shearing edge 92, while the shearing edge 102 is provided with a similar concavity 108 in line with the protuberance 98 in the shearing edge 94.

As the movable die 66 is forced downward relative to the die 64, the shearing edges 100–92 and 102–94 slice out of the intervening strip 30 a narrow piece of the metal corresponding to the clearance (for example ¼") between edges 92 and 94; this narrow piece being scrap and being discarded.

The pressure exerted on the strip 30 by the relative movement of the dies 66 and 64 not only causes cutting of the strip as described above but simultaneously bends the sheet metal at the cut edges to correspond to the S-shaped configuration caused by the concavities 96 and protuberances 98. Thus, as shown in Fig. 7, when the cut has been completed the leading edge 110 of the main strip 30 is provided with a concavity 112 and protuberance 114 (giving an S-shaped curve at that zone of the edge 110). The trailing edge 116 of the cut length is likewise provided with a concavity 112 (in line with the protuberance 114 in the edge 110) and a protuberance 114 (in line with the concavity 112 in the edge 110). The two S-shaped curve portions of the edges 110 and 116 inter-cross, as indicated in Fig. 7A, to give a generally "figure 8" pattern.

On the next forward movement of the main strip 30, its leading cut edge 110 comes into contact with the trailing cut edge 116 of the severed length in front of it and, with each subsequent intermittent forward movement of the main strip, all preceding cut lengths of the strip entering and passing through the forming dies are pushed forward and gradually moved through the forming dies under the action of the feed mechanism.

The main strip 30 and the preceding cut lengths are advanced only a small fraction of an inch with each intermittent forward stroke of the feed mechanism. However, the movable cut-off die 66 is not again actuated until, as described above, the completion of forward movement of a fully formed work piece emerging from the forming dies contacts the switch feeler 88 and causes air-actuated downward cutting movement of the die 66 followed by spring-actuated upward return movement, all during the period of time during which the strip is intermittently halted. The opposed burrs 112—114 of adjoining cut edges prevent over-riding or under-riding during the pushing action. The burrs are flattened at the last stage of the forming of the work piece.

The concavities 108 in the shearing edges 100 and 102 of the movable die 66 function to minimize the possibility of tearing or splitting of the sheet metal of the strip 30 during the shearing operation. Thus, if the edges 100 and 102 were straight, the extra stress exerted in the zones of the protuberances 98 in shaping as well as cutting the sheet metal could result in tearing or splitting or breaking of the metal adjacent the cut edges 110 and 116. However, by providing the matching concavities 108 in line with protuberances 98, the concavely arcuate shearing edges of the concavities 108 provide simultaneous cutting along the convexly arcuate shearing edges of the protuberances 98 which makes for clean cutting with little or no tendency to split or tear or fracture the sheet metal adjoining the cut edges at the burrs.

After leaving the burr cut-off dies, the cut lengths of flat strip are pushed, one in front of the other, through the forming dies by the intermittent advancing action of the feed mechanism.

The forming dies include a lower stationary die 118 mounted on top of the lower frame member 36, and an upper reciprocable die 120 mounted on the underside of the platform 74 mentioned above. The platform is supported from and below an upper stationary frame member 122 by a pair of vertical rods 124 which extend upward from the platform, through holes in the member 122, and protrude upward beyond said member. The upwardly protruding portion of each rod 124 is provided with a compression spring 126 and an uppermost screw-threaded adjusting and retaining nut 128 for the spring; the lower end of the spring being seated against the top of the frame member 122. In this way, the platform 74 is normally resiliently maintained in elevated position, wherein the movable forming die 120 is spaced slightly away from and above the lower stationary die 118.

As will be more fully described, it is important that the forming of the cut length of flat strip into the final work piece of predetermined shape take place gradually, through a series of intermediate shapes, by means of rapid short-stroke reciprocation of the upper movable forming die or head 120 relative to the lower stationary forming die or head 118. The means for providing this rapid short-stroke reciprocation or oscillation will now be described.

Mounted on the underside of the upper frame member 122 are a pair of vertically disposed side-by-side cylinders 130, containing pistons (not shown); the lowermost protruding ends of the piston stems being fastened to the platform 74 by pins 132, as shown in Fig. 1. A hydraulic fluid line 134 connects with the upper ends of both cylinders 130 through a T 135. When pressure is transmitted to the upper ends of the cylinders 130 through the fluid line 134, the pistons are moved downward in unison so as to force the platform 74 downward (against the action of springs 126) until the upper forming die or head 120 is brought into operative juxtaposition with the lower stationary die or head 118. However, when the hydraulic pressure is relieved or drops, the springs 126 automatically raise the platform 74 so as to lift the upper forming head 120 clear of the lower head 118.

A reciprocating pump 136 is connected to the lower end of the hydraulic fluid line 134. A flywheel 138, driven by a motor 140, is provided with a very slightly eccentric cam 142 and a cam follower 144; the free end of the cam follower being pivotally connected as at 146 to the protruding upper end of the piston stem of the pump 136. Thus, the circular motion of the flywheel is converted into the rapid short-stroke reciprocation of the pump piston to create the necessary pulsating or intermittent pressure in the fluid line 134, which is transmitted to the cylinders 130.

The fluid line 134 is provided with a pressure regulating valve 148 which has a line 150 leading to a liquid storage tank 152, so that any excess oil or other hydraulic liquid is sent to the tank. In order to fill the line 134 with hydraulic liquid, there is provided a small pump 154 mounted on top of the tank 152 and connected with the liquid in the tank by a standpipe 156. The pump 154 is driven by an electric motor 158 and sends liquid from the tank, through a relief valve 160, a check valve 162, and a pressure gage 164 located in a line 166 connecting with the main fluid line 134.

As shown in Fig. 1, the fluid inlet line 60 to the feed mechanism cylinder 38 is also connected to the main fluid line 134. It will be noted that the fluid actuated return movement of the feed piston and fingers takes place more or less simultaneously with the fluid actuated downward operating stroke of the upper forming head 120. Thus, the strip-advancing spring-actuated forward stroke of the feed piston and fingers takes place when the upper forming head 120 is raised away from the lower head 118 by the springs 126. In other words, the intermittent feed advance of the cut lengths of strip through the forming dies is synchronized to take place when the two forming heads are spaced apart to permit such advancing movement.

The forming heads 118 and 120 may optionally be heated to facilitate the forming process depending on the nature of the material being treated, the thickness or gage of the sheet material, the rate of formation, and various other factors. In Fig. 1, the forming heads 118 and 120 are shown as provided with internal electical resistance heating wires or elements 168 of conventional construction. Of course, gas heat, radiant heat or other conventional heating means could be employed instead, either at or adjacent the forming heads.

During the forming operation, the cut lengths are intermittently fed between the forming heads 118 and 120 in short strokes so that, in conjunction with the shape of the complementary dies in the forming heads, only a partial forming of the material takes place with each stroke. Of course, various die shapes can be used in the forming heads 118 and 120 depending on the shape of the final product desired. Where the shape of the final product is complex or involves different kinds of intermediate forming operations at different stages, two or more different-shaped pairs of complementary die sections can be used in series along the forming heads to achieve the desired result, as will be described.

In Figs. 4, 9 and 10, there is illustrated the manner in which the originally flat cut length of strip or ribbon is changed gradually to the product 32 shown in Fig. 22, namely a channel member of "hat" section (i.e., having U-shaped cross-sectional configuration with diverging parallel flanges at the edges of the arms of the U). Figure 10 schematically shows the lower stationary forming head 118. In order to lubricate the length of material during the forming operation, oil or other suitable lubricant is fed to an internal chamber (not shown) of the head 118 through an inlet pipe 170 and emerges through slots 172 adjacent the forward end of the head 118. Similar provision (not shown) can be made for lubricating the upper forming head 120 as well. Extending axially along the center and bottom of the female die carried by the lower head 118, is an elongated pad 174 which, as indicated in Fig. 4, has a groove 176 running along its underside, within which are disposed a plurality of axially spaced vertically disposed helical compression springs 178 which yieldingly tend to lift the pad 174 to a level at which it is halted by contact with a pair of transversely spaced axially extending downwardly-directed shoulders 180.

The pad 174 is so disposed within the central groove 182 of the female die element 184 carried by the lower forming head 118 that when, as indicated in Fig. 4, the male die element 186 carried by the upper movable forming head 120 is forced against the intervening strip being shaped, the pad is forced downward (the springs 178 being compressed) until the bottom surface of the pad rests against the bottom wall of the groove 182 while the top surface of the pad is substantially in alignment with the adjoining stationary top surfaces of the element 184 so that, in effect, the pad and the adjoining areas of the element 184 provide a substantially continuous rigid top surface in opposition to the male element bottom surface in the shaping of the strip. However, when the male element 186 is moved away (by reason of the upward movement of the forming head 120), the pressure of the springs 178 raises the pad 174 (to the limiting level provided by the shoulders 180) and in so doing lifts the partially shaped work piece away from the stationary top surfaces of the female element 184. This prevents sticking of the work piece to the die element of the stationary forming head 118 and ensures easy forward movement of the partially shaped strip or ribbon under the action of the feed mechanism.

Figure 9 indicates schematically how the originally flat strip is gradually shaped into the final "hat section" configuration of Fig. 22. Thus, as the flat strip first enters the initial forming area (the edges of the flat strip initially passing underneath inwardly-directed guide members 188 shown in Fig. 10) it is very slightly bent along four fold lines, at extreme obtuse angles, so that, after the first few strokes of the movable forming head 120, it has the approximate cross-sectional configuration shown in the top cross-sectional view of Fig. 9. The shape of the female element 184 at that point is shown by the indicating arrow pointing to Fig. 10, and, of course, corresponds to the underside of the corresponding cross-sectional view of Fig. 9.

While the shape of the male die element 186 at this point is not shown, it corresponds of course to the upper side of the top cross-sectional view of Fig. 9.

As the strip is gradually pushed intermittently between the forming heads, the bends in the die elements 184 and 186 gradually become more pronounced so that, with each downward movement of the movable forming head 120, the four fold lines in the strip become slightly less obtuse. The second and third cross-sectional views of Fig. 9 show this change while the arrows indicate the shape of the female die element 184 at the corresponding points in Fig. 10. It is apparent that, as the four fold lines become less obtuse, gradually acquires greater depth as its transverse dimension or width becomes less.

Finally, at the end of the forming operation, as shown in the lowermost cross-sectional view of Fig. 9 and indicated by the corresponding arrow in Fig. 10, the four bends have become rectangular, and the work piece has assumed its final configuration of Fig. 22, namely a base, parallel sides extending at right angles to the base and co-planar diverging flanges extending at right angles from the upper edges of the two sides.

As the leading end of each length of work piece is completely formed, it emerges from the forming heads, advancing intermittently as the formation of the remainder of that work piece is completed. As stated above, the switch 86 is so positioned with respect to the delivery end of the forming heads that, at the completion of the last advancing movement following the final forming stroke on a given work piece, the leading edge of the work piece contacts and tilts the switch feeler 88 and actuates the burr cut-off mechanism to cut another length of strip entering the forming heads. On the next advancing movement of the feed mechanism, the aforesaid completed work piece falls free of the forming heads into a suitable chute or receptacle (not shown).

The last stroke or two of the forming head 120 is also employed to flatten the burr 112—114 formed in the trailing edge of the first cut length, as described above, so that the edge of the final work piece is smooth and flat. Of course, the burr 112—114 formed in the leading edge of each cut length is flattened beforehand as the leading edge reaches the delivery end of the forming heads.

As indicated above, the "hat section" form of Fig. 22 is only one of an almost infinite number of shapes which can be formed from flat strip in accordance with the present invention.

For example, in Figure 23, there is shown a product 190 comprising a generally U-shaped channel with co-planar inturned flanges formed at the upper free edges of its parallel side walls. In order to form this product 190, the cut length of flat strip is first gradually bent along two parallel fold lines, the bends becoming less and less obtuse until they are rectangular, giving an intermediate product which is a simple channel of U-shaped cross-section (not shown). These intermediate steps would correspond generally to the steps illustrated in Fig. 9, except that the two outer fold lines (which form the outwardly directed flanges) would be omitted. After this intermediate shape has been completed, the strip passes between a different pair of die elements (mounted in the forming heads in series with the first pair) for the purpose of forming the inturned flanges. As shown in Fig. 13, the female die element 192 of this pair (which is mounted in the lower stationary forming head 118) is provided with a pair of laterally spaced pivotally mounted rocker portions 194 each urged upwardly by an underlying spring 196. The upper edge of each rocker portion is provided with an inwardly-directed flange 198 whose undersurface 200 forms a hammer which cooperates with an upper shoulder 202 on the male die element 204 to bend the flange of the work piece inward on the down stroke of the movable forming head.

On the upstroke of the movable forming head, the springs 196 operate to tilt the rockers upwardly which frees the work piece from the stationary upper surface of female element, thereby eliminating the need for the spring-loaded pad described above in connection with Figs. 4 and 10.

The generally rectangular configuration of the flanges 198 and shoulders 202 represent the final stage in the formation of the inturned flanges of the product 190. Actually, these angles start off as extremely obtuse and gradually become less obtuse nearer the delivery end of the forming heads until they assume the rectangular configuration of Fig. 13. This gradual increase in the sharpness of the bends corresponds to that described above in connection with Fig. 9, and does not require repetition.

To illustrate further the flexibility of the present process in the formation of complex shapes, there are shown schematically in Figs. 14 to 21 the steps and apparatus used in shaping a flat strip into the product 206 shown in Fig. 24 which is an open-ended box with a side fold or bend completing the box section.

Thus, Fig. 14 is a schematic view indicating various intermediate stages through which the originally flat strip passes in reaching the final configuration, while Figs. 15–21 are schematic cross-sectional views showing the shapes of the different pairs of top and bottom forming die elements and the shapes of the intervening strip at generally the locations indicated by the corresponding section lines of Fig. 14.

In Fig. 15, there are shown the first pair of top and bottom forming die elements 208 and 210 which bend the original flat strip into the shape illustrated at 212 in Fig. 14, namely a slightly upturned left flange or wall 214 and a slightly down-turned right flange or wall 216. In Fig. 15, the elements 208 and 210 are shown as provided with lubricant passageways 218 and 220.

While lubricant passageways are not shown in Figs. 16–21, it is to be understood that all of the forming die elements can be, and preferably are, provided with similar lubricant passageways.

In the shape illustrated at 222 in Fig. 14, the flanges or walls 214 and 216 have been bent further so that they are less obtuse. This progressive sharpening of the bend can be done by the original pair of die elements 208 and 210 by a gradual change in shape corresponding to that exemplified in Fig. 10.

At the point illustrated at 224 in Fig. 14 and also illustrated in Fig. 16, the left flange 214 has been bent up still further (although not yet rectangular) while the right flange or wall 216 has been bent downward further into rectangular relationship with the main portion of the strip. This shape can be achieved with the original pair of die elements 208 and 210 whose configurations have gradually been modified into those shown in Fig. 16.

Beyond the point 224, a new upward bend is started somewhat inward of the right downwardly directed wall 216. This upward bend gradually becomes more pronounced to form an upwardly and outwardly inclined wall 226 as illustrated at the point 228 in Fig. 14. Finally, at the point illustrated at 230 in Fig. 14 and also in Fig. 17, this new upward bend becomes rectangular so that wall 226 extends perpendicularly upward while the wall or flange 216 which originally extended downward now extends horizontally outward. Also, the left flange 214 is now bent slightly further upward so that it is rectangular with respect to the main portion of the strip. The formation of the wall 226 is accomplished by use of a new pair of die elements 232 and 234. In Fig. 17, these die elements 232 and 234 are shown as they appear at the completion of the rectangular upward bend of wall 226. It is to be understood however that this is a gradual evolution from an original extremely obtuse bend in a manner similar to Fig. 10.

Beyond point 230 in Fig. 14, there is started still another upward bend appreciably inward of wall 226. This bend becomes gradually more sharp and, as illustrated at point 236 in Fig. 14, a new wall 238, inclined upwardly and outwardly, is formed. The bend becomes more pronounced until, at point 240, the angle is reduced almost to rectangular. This position is also shown in Fig. 18 and it will be noted that now wall 238 extends substantially vertically upward, wall 226 extends substantially horizontally inward, and wall 216 extends substantially vertically upward. This formation of wall 238 is accomplished by a new pair of top and bottom die elements 242 and 244 which are shown in Fig. 18 as they appear at point 240 of Fig. 14. Again, it is to be understood that, as in Fig. 10, there is a gradual evolution from an originally extremely obtuse bend configuration to the shape of Fig. 18 and a further evolution to a full rectangular bend with the wall 238 perpendicular to the adjoining portion of the main strip.

Beyond point 240, still another upward bend is started slightly inward of wall 238 to form a new wall 246 shown at point 248 of Fig. 14 and also shown in Fig. 19. As the new wall 246 is bent up, the relatively wide wall 238 is tilted inward to provide an increasingly great overhang which necessitates the use of a new pair of top and bottom die elements 250 and 252; the top element 250 being undercut so that it extends beneath the wall 238 and cooperates with element 252 in forming the obtuse bend which directs the wall 246 at an upwardly and outwardly inclined angle. Again, there is gradual evolution of the die elements to give gradually less obtuse bend configuration and, at the same time, the recess within which the walls 238, 226 and 216 are received changes in shape gradually as the angle of inclination changes.

Upward bending of wall 246 continues beyond point 248 until the bend becomes rectangular and wall 246 extends straight up from wall 254 which represents the remainder of the original unaltered flat strip. As wall 246 reaches the point shown at 256 in Fig. 14 at which it extends straight up, wall 238 extends horizontally from right to left, wall 226 extends vertically downward, and wall 216 abuts wall 254 and extends horizontally from right to left with its free edge terminating adjacent the vertically upwardly extending left wall 214. It should be noted that wall 246 is slightly wider than wall 226 (to accommodate the thickness of abutting wall 216), while the width of wall 254 is sufficient to accept the combined horizontal dimension from the left hand free edge of wall 216 to the right edge of wall 238.

Beyond point 256, the vertical left wall 214 is gradually bent inward (i.e. toward the right) to form gradually more acute angles as indicated at points 258 and 260, so as to overlie wall 216. As the gap in the box section is gradually closed, the die elements 242 and 244 of Fig. 19 are necessarily replaced and, instead, a new pair of die elements 262 and 264 are used to complete the closing of the box section by exerting downward pressure on wall 238. As indicated in Fig. 20, top die element 262 may be provided with a spring loaded pad 266 similar to that shown in Fig. 4. Again, the bending involves a gradual evolution in the shapes of the dies as the angles become less obtuse. The inward bending of wall 214 is accomplished by an inclined surface 268 on die element 262 which is not introduced into the die element until after point 256 has been passed.

Finally, at point 270 of Fig. 14, wall 214 is completely flattened into horizontal position overlying and clamping the wall 216 to complete the fabrication of the open-end box section of Fig. 24. This is done by gradually modifying die element 262 so that a flat horizontal wall 272 replaces inclined surface 268.

As is evident from the foregoing description of Figs. 14–21, there are few shapes which cannot be made from flat strip in accordance with the present invention. Hollow lengths of tubular or polygonal cross-section; channels, plain or flanged, of V-shaped, J-shaped, U-shaped, W-shaped, L-shaped and other cross-section; and countless other products can be made quickly, easily and inexpensively. Apparatus for producing these products in accordance with the present invention costs only a fraction of the cost of tube rolling mills or other conventional apparatus heretofore required for the purpose. Far greater flexibility results from the fact that forming heads can be interchanged and multiple pairs of forming heads can be used in series with each pair producing a number of bends as desired. The present process gives products which are perfectly straight and can be held to extremely close tolerances. The size and gage of the material being worked on can vary through extremely wide limits; outsize material simply requiring larger apparatus and greater pressure. With a hydraulic system like that described above, extremely high pressures can be exerted upon the movable forming head.

Well in excess of 3,000 feet of product can be formed per hour without any difficulty.

The burr cut-off contributes greatly to the speed and versatility of the process. Thus, the cutting of individual lengths is done on the flat unbent strip instead of the final shaped product as is customary. This means that the shape of the cut-off dies remains the same regardless of the shape of the product. It is an extremely simple and dependable device which is much less costly than conventional methods (for example the "flying cut-off") ordinarily employed. The dependable pushing action resulting from the novel "burr" shaped cut eliminates the need for welding the end of one strip or roll to the beginning of the next, as is required with conventional "pull through" feeds.

The movable cut-off die needs only a very short stroke (which may be of the order of 2 to 2½ times the thickness of the strip) which can be made rapidly so that the stoppage interval of the intermittent feed can be made very short.

Although, in Fig. 1, the cut-off mechanism is itself mounted on the reciprocating platform 74, this does not interfere with its operation since the extent of oscillation or reciprocation of the platform is much smaller than that of the movable cut-off die and since the stroke of the cut-off die is made sufficiently long to allow for the extreme variations possible in the position of the platform. Of course, the cut-off mechanism can instead be mounted on a stationary part of the frame, for example the lower frame member 36, without departing from the spirit of the invention.

The use of spring loaded pads assists in preventing over-riding and under-riding of adjoining cut edges by maintaining them in proper alignment, in addition to its main function of preventing sticking the work piece to the stationary forming head during the upstroke of the movable head.

Obviously, the stationary forming head could be placed on top and the movable head on the bottom (with an upward forming stroke) without departing from the invention.

In Fig. 8, there is shown a machine representing another embodiment of this invention wherein the forming heads and feed mechanism are mechanically actuated instead of being hydraulically actuated as in the embodiment of Fig. 1. It is pointed out that a hydraulic system is preferred where large or thick-gage strip is being formed but where maximum speed is not essential. The mechanical system, on the other hand, achieves much greater speeds (for example the figure of more than 3,000 feet per hour mentioned above) where relatively small or thin strip is being shaped, but cannot operate with extremely large or thick material, since the high speed mechanical linkages are not equipped to transmit nearly as high operating pressures as the hydraulic system.

The embodiment of Fig. 8 includes a base 300, on which is mounted a stationary forming head 302, which can resemble any of those hereinabove described.

Above the base is mounted a flywheel 304 driven by a motor 306 and carrying a geared pinion 308 which engages a pair of side-by-side spur gears 310. Each gear 310 is provided with a slightly eccentric circular cam 312, engaged by a cam follower 314 which extends downward and is pivotally connected, at its lower end, at 316, to the upper movable forming head 318, which can resemble any of the movable forming heads described above.

As the gears 310 are rotated about their shafts (not shown) by the rotating flywheel 304 and pinion 308, the cams 312 and cam followers 314 convert the rotary motion into reciprocating linear motion which raises and lowers the upper forming head 318 relative to the fixed head 302 to give the high speed short-stroke shaping action to the strip passing between the heads in a manner similar to that described above in connection with the embodiment of Fig. 1.

The feed mechanism 320 of this embodiment is a conventional intermittent drive roller device which is mounted on the base 300 and includes a pair of side-by-side laterally extending lower rolls 322 located beneath the flat strip 30 (which is taken from a coil on storage reel 34 as described above) and another pair of side-by-side laterally extending upper rolls 324 located above the strip 30; a compression spring 326 urging the upper rolls 324 downward against the correspondingly placed lower rolls 322 so that the strip 30 passing therebetween is pushed through when the rolls are rotated (from a suitable driving mechanism, not shown). The pressure of the spring 326 is so adjusted that, if unusual resistance is encountered by the strip being forced forward by the rolls (for example by the action of the cut-off mechanism to be described) the rolls will simply slip and the strip will halt rather than be buckled by continued forward movement.

As mentioned above, the intermittent drive mechanism 320 is conventional and can be purchased on the open market. It contains means (requiring no explanation herein) whereby it can be adjusted to drive and halt at predetermined times and for predetermined intervals. Thus, the drive mechanism can be set to feed the strip 30 forward intermittently only when the movable forming head 318 is in elevated position providing the necessary clearance between it and the stationary head 302. When the two heads are brought together, the drive mechanism is halted so that there is no forward movement of the strip 30.

Mounted intermediate the feed mechanism 320 and the forming heads, is a burr cut-off mechanism like that described hereinabove. However, in this case, the cut-off mechanism is mounted not on the moving forming head but on the stationary base 300 by means of a bridge member 328 which straddles the strip 30 and supports the cylinder 72 above the strip.

In Fig. 8, as in the previously described embodiment, the piston stem 68 protrudes downwardly and carries the movable downwardly acting cut-off die 66 at its lower end; the die 66 being normally maintained above the level of the strip 30. The stationary cut-off die 64 is located below the level of the strip 30 in the manner previously described.

Where extremely thin strip material is being formed, it may be desirable to guard against buckling of the strip during the cut-off operation and, for this purpose, an upper stationary die member 330 may be located above the strip 30 with an opening and transversely extending portions generally in vertical alignment with the corresponding parts of the lower die member 64. The upper stationary member 330 does not cooperate with the movable member 66 in the cutting operation (its transverse opening being somewhat wider than the transverse rectangular opening in the member 64 so that its edges are spaced from the shearing edges of the movable die member 66), its function being solely to prevent buckling of the strip during the shearing operation by providing rigid supporting surfaces above as well as below the strip.

In Fig. 8, the actuating fluid for the cut-off cylinder 72 is indicated as being compressed air delivered to the upper end of the cylinder 72 by a line 332 leading from a compressor 334. A solenoid valve 336 located in line 332 controls the flow of air therethrough. The valve 336 is normally closed, and is connected by wires 84 to the normally-open quick-acting switch 86, mounted in predetermined spaced relationship to the delivery end of the movable forming head 318, and being provided with feeler 88 in a manner similar to that hereinabove described. At the conclusion of the forward stroke following the completion of a work piece, the leading edge of the work piece displaces the feeler 88, closing switch 86 and opening valve 336 to enable compressed air to flow through line 332 into cylinder 72.

The compressed air entering cylinder 72 forces the piston, piston stem and movable die 66 downward (against the pressure of the upwardly acting piston spring) so as to form the burr cut-off at a time when the strip is not moving. When the completed work piece falls free of the feeler 88, it returns to switch opening position, so as to close valve 336 and cut off air pressure from cylinder 72, thereby making possible the spring-actuated upward return stroke of the piston, piston stem, and die 66, in the same manner as previously described.

Of course, a liquid hydraulic system or other suitable means could be employed in place of the compressed air system for actuating the movable die 66.

In Fig. 8, the upper movable forming head 318 is shown as being relatively heavy, the downward forming stroke being a gravity-actuated stroke, while the upward return stroke results from the lifting action of the cams 312 and cam followers 314. It is, of course, obvious that the forming stroke could instead be one that is actuated by the cam mechanism with a return stroke actuated by gravity (for example when the movable head is beneath and working upward) or by spring action or in any other suitable manner.

While the cutting action of the cut-off die 66 is preferably timed so as to occur when the intermittent feed mechanism 320 is halted, this is not critical with lightweight strip since the downward stroke of die 66 will halt the movement of the strip and the slippage provision, described above, incorporated into the feed mechanism will cause the rolls 322 and 324 to slip though turning without advancing the strip or causing buckling thereof. At most, operation of the die 66 while the strip is moving will cause very slight scratching of the cut edges of the strip which are substantially eliminated during the subsequent forming operation.

The present invention may be embodied in other specific forms without departing from the spirit or essential attributes thereof, the above-described forms being in all respects merely illustrative and not restrictive, and therefore reference is made to the appended claims, rather than to the foregoing specification, as indicating the scope of the invention.

Having thus described our invention, we claim as new and desire to protect by Letters Patent the following:

1. A method of forming an elongated thin flat strip of deformable material into a plurality of individual lengths of shaped cross-sectional configuration, said method comprising the steps of feeding the flat strip by an intermittent pushing action; cutting the flat strip transversely into tandemly disposed spaced individual lengths as it is intermittently advanced by the feeding action; forming abutting deformations or burrs on the opposed cut edges of the flat strip, said burrs being substantially displaced from the plane of the flat strip and providing a secure interlock between the adjoining cut edges so as to prevent one edge from riding over or under the other during the push feeding; and gradually changing successive cut lengths from their original flat configuration to their final shaped configuration by a rapid short stroke hammering action while said successive tandemly disposed spaced cut lengths are intermittently pushed forward by the feeding action on the original elongated flat strip, said hammering action being synchronized with the intermittent pushing action so that the hammering stroke occurs when the length is momentarily halted.

2. A method according to claim 1 wherein the cutting action is a reciprocating one and is synchronized with the intermittent pushing action so that the cutting stroke occurs when the length is momentarily halted.

3. A method according to claim 1 wherein the deformations or burrs are flattened at the end of the shaping operation on each successive cut length, and wherein the cutting action is synchronized with the shaping operation so that a fresh length is cut from the elongated strip as the shaping of each successive cut length is completed.

4. A method according to claim 1 wherein the burrs or deformations are made simultaneously with the cutting action as a more or less unitary operation, and wherein the burr on each cut edge is formed so that it has at least one portion displaced in one direction from the plane of the strip and at least one other portion displaced in the opposite direction from the plane of the strip, the two portions on one cut edge being in alignment with the oppositely displaced portions on the adjoining cut edge.

5. A method according to claim 1 wherein the cutting action is a reciprocating one and is arranged to form a pair of transverse slightly spaced apart cut edges, with a narrow piece of intervening material removed during the cutting action, and wherein the deformations or burrs are formed on the two cut edges simultaneously with the cutting action.

6. A method according to claim 5 wherein the burr on each cut edge is formed so that it has a portion displaced in one direction from the plane of the strip and another portion displaced in the opposite direction from the plane of the strip, the two burr portions on one cut edge being in alignment with the oppositely displaced burr portions on the other cut edge.

7. Apparatus for forming an elongated thin flat strip of deformable material into a plurality of individual lengths of shaped cross-sectional configuration comprising means for feeding the flat strip by an intermittent pushing action; means located beyond the feeding means for cutting the strip transversely into tandemly disposed spaced individual lengths as it is intermittently advanced by the feeding means; means for forming deformations or burrs on both transverse cut edges, said burrs providing an abutting interlock between adjoining cut edges so as to prevent one edge from riding over or under the other edge under the pushing action of the feeding means; and shaping means for gradually changing successive cut lengths from their original flat configuration to their final configuration, said shaping means comprising a pair of complementary dies gradually changing in shape from one end to the other, means for guiding the successive tandemly disposed spaced cut lengths so that they are intermittently advanced between the dies under the action of the feeding means, and reciprocating means for imparting a rapid short stroke hammering action to one of said dies so that each cut length is changed in shape very slightly with each hammering stroke, and means synchronizing said reciprocating means with the intermittent feeding means whereby the hammering stroke of the die occurs while the cut length is momentarily halted and whereby the cut length is pushed forward between the dies while the reciprocating die is momentarily retracted.

8. Apparatus according to claim 7 wherein the strip cutting means comprises a stationary cutting die and a reciprocable cutting die, and wherein means are provided for synchronizing the movement of the reciprocable cutting die with the intermittent feeding means so that the cutting stroke of the die occurs when the length is momentarily halted.

9. Apparatus according to claim 7 wherein the shaping dies are constructed and arranged to flatten the burrs at the cut edges of successive lengths as said cut edges reach the outlet end of the dies, and wherein means are provided for synchronizing the cutting means with the operation of the shaping dies so that a fresh length is cut from the elongated strip as each successive fully shaped length emerges from the shaping dies.

10. Apparatus according to claim 7 wherein one of the shaping dies is provided with a spring-loaded retractible pad which is constructed and arranged momentarily to lift the cut length off the die when the two dies are in relatively spaced apart position so as to prevent the length from sticking to the die.

11. A machine for forming an elongated thin flat strip of deformable material into a plurality of individual lengths of shaped cross-sectional configuration comprising a stationary forming head; a reciprocable forming head mounted in operative juxtaposition to the stationary head; complementary shaping dies mounted in the two heads and gradually changing in shape from one end to the other; means for guiding the material between the two forming heads; means for rapidly reciprocating the reciprocable forming head so that it exerts a rapid short-stroke hammering action on the material between the heads; feeding mechanism for intermittently pushing the strip in the direction of the forming heads; cutting mechanism located between the feeding mechanism and the forming heads for shearing the flat strip transversely at predetermined intervals so as to form successive tandemly disposed spaced individual flat lengths of the material before entering between the forming heads; mechanism for forming deformations or burrs on both transverse cut edges produced by the cutting mechanism, said burrs providing an abutting interlock between adjoining cut edges so as to prevent one edge from riding over or under the other edge under the pushing action of the feeding mechanism; and means synchronizing the forming head reciprocating means with the intermittent feeding mechanism so that the hammering stroke of the forming head takes place while the intervening cut length of material is momentarily halted, and so that the intervening cut length is pushed forward between the forming heads while the heads are momentarily spaced apart.

12. A construction according to claim 11 wherein the forming head reciprocating means comprises a hydraulic system containing a pressure-transmitting liquid or the like and including a pump constructed and arranged to impart a rapidly pulsating pressure to said liquid; a cylinder operatively connected to said hydraulic system; a piston reciprocably mounted within said cylinder and operatively connected to the reciprocable forming head; means normally urging said reciprocable forming head away from the stationary head, the pulsating pressure of the hydraulic system intermittently moving the piston and its connected forming head toward the stationary head; and wherein the intermittent feeding mechanism includes a cylinder operatively connected to the aforesaid hydraulic system; a spring-loaded piston mounted within said cylinder; and strip-gripping means operatively connected to said last-mentioned piston, said strip-gripping means being constructed and arranged to grip and advance the strip when the piston moves in one direction and to slide in non-gripping relationship to the strip during the return stroke of the piston.

13. A construction according to claim 11 wherein the forming head reciprocating means comprises a driven flywheel and mechanical linkage for converting the rotary motion of the flywheel into reciprocating linear motion and for imparting the latter to the forming head; and wherein the intermittent feeding mechanism includes opposed driving rollers on opposite sides of the strip, and means for starting and stopping the rollers at predetermined intervals.

14. A construction according to claim 11 wherein the cutting mechanism includes a stationary cutting die and a movable cutting die with the strip passing therebetween; means including a cylinder and a spring-loaded piston mounted therewithin for reciprocating the movable cutting die to provide a fluid-actuated shearing stroke and a spring-actuated return stroke; and means synchronizing the movement of the cutting die with the advancing movement of the cut lengths of strip so that the cutting die is actuated to cut a fresh length from the strip as each fully shaped length emerges from the forming heads.

15. A construction according to claim 14 wherein the cutting die cylinder is connected to an air compressor or the like by a line having an electrically operated valve mounted therein; and wherein an electrical switch is mounted a predetermined distance from the outlet end of the forming heads and is operatively connected to said valve, said switch being tripped by each fully formed length emerging from the forming heads so as to operate the valve and thereby to actuate the piston and the movable cutting die.

16. A construction according to claim 11 wherein the burr forming mechanism is an integral part of the strip cutting mechanism; and wherein the strip cutting mechanism is constructed and arranged to make two simultaneous parallel cuts spaced slightly apart with an intervening piece of scrap removed from between the cuts, the burrs formed on the two spaced apart cut edges being generally S-shaped and being reversed relative to each other so as to give more or less a figure-8 configuration when brought together.

17. For simultaneously shearing and deforming a thin flat strip of metal or the like, a female die member having a pair of parallel shearing edges with an appreciable clearance therebetween; a male die member having a thickness such that it can fit snugly within the aforesaid clearance and having a pair of parallel shearing edges spaced apart and constructed and arranged to wipe across the shearing edges of the female die member so as to make two simultaneous parallel spaced cuts in the strip with an intervening piece of scrap removed from between the cuts, each of the shearing edges of the female die member having a relatively small burr-forming portion displaced appreciably from the line of the shearing edges and constructed and arranged to form matching burrs in the parallel strip cuts; and means for causing reciprocating movement of one of said die members relative to the other.

18. A construction according to claim 17 wherein each burr-forming portion comprises a generally arcuate concavity and protuberance disposed side-by-side to give a generally S-shaped bend in the shearing edge and to form a corresponding S-shaped bend in each of the cuts in the strip, the S-shaped bends in the two shearing edges being reversed relative to each other so as to give more or less a figure-8 configuration when the cut edges of the strip are brought together.

19. A construction according to claim 18 wherein each of the shearing edges of the male die member is provided with a concavity in line with the protuberance of the adjoining shearing edge of the female die member.

References Cited in the file of this patent

UNITED STATES PATENTS

| 1,456,845 | Fuller | May 29, 1923 |
| 1,503,884 | Curtis | Aug. 5, 1924 |
| 1,661,108 | Coates | Feb. 28, 1928 |
| 1,909,930 | De Ridder | May 23, 1933 |
| 2,055,185 | Templeton | Sept. 22, 1936 |
| 2,214,110 | Ott | Sept. 10, 1940 |
| 2,569,197 | Royer | Sept. 25, 1951 |
| 2,700,408 | Babbit | Jan. 25, 1955 |
| 2,781,816 | Lawson | Feb. 19, 1957 |
| 2,813,571 | Cicero | Nov. 19, 1957 |

FOREIGN PATENTS

| 587,402 | Great Britain | Mar. 18, 1947 |